(12) United States Patent
Linton et al.

(10) Patent No.: US 9,074,888 B2
(45) Date of Patent: Jul. 7, 2015

(54) GYRO DRIFT CANCELATION

(71) Applicants: Thomas D. Linton, Lake Saint Louis, MO (US); Michael T. Fox, St. Charles, MO (US); Bruce E. Exely, St. Louis, MO (US)

(72) Inventors: Thomas D. Linton, Lake Saint Louis, MO (US); Michael T. Fox, St. Charles, MO (US); Bruce E. Exely, St. Louis, MO (US)

(73) Assignee: DRS Sustainment Systems, Inc., St. Louis, MO (US)

( * ) Notice: Subject to any disclaimer, the term of this patent is extended or adjusted under 35 U.S.C. 154(b) by 265 days.

(21) Appl. No.: 13/752,030

(22) Filed: Jan. 28, 2013

(65) Prior Publication Data

US 2015/0025801 A1     Jan. 22, 2015

(51) Int. Cl.
*G01C 17/38* (2006.01)
*G01C 19/04* (2006.01)
*G01C 19/00* (2013.01)
*G01C 25/00* (2006.01)

(52) U.S. Cl.
CPC ............... *G01C 19/04* (2013.01); *G01C 19/00* (2013.01); *G01C 25/005* (2013.01)

(58) Field of Classification Search
CPC ................................ G01C 21/18; G01C 19/02
USPC ........................................................ 701/530
See application file for complete search history.

(56) References Cited

U.S. PATENT DOCUMENTS 6,396,235 B1    5/2002   Ellington et al.
6,401,036 B1 *  6/2002   Geier et al. ................... 701/495

* cited by examiner

*Primary Examiner* — James Trammell
*Assistant Examiner* — Michael D Lang
(74) *Attorney, Agent, or Firm* — Kilpatrick Townsend & Stockton LLP

(57) ABSTRACT

Methods, devices, and systems are presented for compensating for gyroscopic drift in a stabilized gimbal system mounted on a vehicle. When the vehicle is parked and the gimbal is not being commanded to move by an operator, encoders or resolvers of the gimbal stabilized system are read and periodically read thereafter. When the vehicle begins to move or the gimbal is commanded to move, the last periodic reading of the resolvers is used to determine the amount that the gimbal has moved during the rest period. A gyroscopic drift rate is computed by dividing the amount of angular movement by the time period between the readings, and the gyroscopic drift rate is used for corrections while the vehicle is moving or gimbal is commanded to move. Each time the vehicle stops, the gyroscopic drift rate is re-computed and updated. The gyroscope can be heated until the drift rate is constant with respect to temperature, further helping the calibration.

20 Claims, 5 Drawing Sheets

GYRO DRIFT CANCELATION

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Art

This disclosure is generally related to instrument calibration systems for gyroscopes, and more specifically to correction of gyroscopic drift for gimbal-stabilized platforms mounted on military-grade and other vehicles.

2. Background

Modern warfare has evolved to value precision weapons, which typically limit collatoral damage while reducing ordinance mass required to be delivered to the front lines. Precision weapons include smart bombs, guided missiles and artillery shells, sniper guns, and lasers, among other kinetic and nonkinetic arms. For optimal use, precision weapons require precise targeting so that they can hit their intended targets.

Electro-optical sensors have filled a vast niche required by militaries for precision targeting, as well as reconnaissance, threat warning, and positive target identification. They can be purely passive, relying on sunlight, starlight, or thermal emissions to image a target. Passive image systems do not require illumination from the sensor. Thus, passive image systems can remain hidden from the target as well as others nearby. Light and compact enough to fit on vehicles, they can be taken to a battlefront and employed in combat situations. However, small disturbances to electro-optical sensors, such as vibrations or unsteady hands, are magnified when looking across long distances.

Gimbal stabilization helps electro-optical systems stay pointed at a particular target in the distance, compensating for vibrations as well as movement of a vehicle. Such gimbal-stabilized electro-optical systems have become prevalent on modern military land vehicles and aircraft. A gimbal stabilized platform or other section supports the electro-optical system (or weapon system) and automatically keeps the system pointed at the target without an operator having to make any control inputs.

Gimbal stabilization is often performed using gyroscopes. Gyroscopes, whether mechanical, ring laser, or fiber optic, typically have some gyroscopic drift. That is, they tend to sense a slight amount of rotation even when they are still, owing to imperfections in bearings, laser mirrors, etc. Gyroscopic drift is often in one direction for awhile with a constant rate over time; however, the direction and rate are notoriously unpredictable and can change depending on external factors, such as temperature.

A gyroscope can be mounted on a movable, pointable section of a gimbal, such as an elevation axis of a pan-tilt gimbal. When the gimbal is moved in azimuth, elevation, etc., the gyroscope senses rotation and outputs the angle directions to which the movable section points. The gyroscope can be part of a closed loop system that stabilizes the gimbaled platform.

Common gimbal systems for heavy equipment include pan-tilt mechanisms. A pan-tilt mechanism includes a fixed base, a pan assembly, and a tilt assembly. The pan assembly is attached to the fixed base and rotates around a vertical axis. The tilt assembly is mounted to the pan assembly and rotates around the vertical axis with the pan assembly. The tilt assembly also rotates around a horizontal axis to point up or down. Thus, the tilt assembly can be panned (i.e., turned in azimuth) and tilted (i.e., raised in elevation).

A "half-yoke" assembly includes a gimbal with a pan assembly that cantilevers a tilt assembly on one side. A "full-yoke" assembly includes a gimbal with a pan assembly that supports a tilt assembly between two ears.

Smaller gimbal systems can include ball head gimbals. In such a design, a ball head (i.e., a sphere) is held captive by supports. The supports can be fingered, opposite each other like a vise, or formed as a monolithic socket. A platform supported by the sphere can be rotated up and down or side to side as desired.

In any gimbal design, a direction to which the gimbal points can be determined by two angles: an azimuth angle and an elevation angle. These angles can be measured with resolvers or encoders in motors that drive the azimuth and elevation angles or are otherwise embedded in the gimbal assembly.

An inertial navigation unit (INU) can be used to determine the geographic location of a vehicle (e.g., latitude, longitude, height above mean sea level). With the geographic location vehicle and a position of the target with respect to the vehicle, a geographic location of the target can be easily determined. The geographic coordinate can be used for precision weapon delivery from another vehicle to the target.

Even with all of this advanced equipment, there is a constant desire for perfection. There is a need in the art for better, more precise, more accurate gimbal assemblies and stabilization algorithms.

BRIEF SUMMARY

Generally, methods, devices, and systems for correction of gyroscopic drift of vehicle-mounted gyroscopes are presented. A sensor detects when the vehicle is not moving, and another sensore detects that the gimbal is not commanded to be slewed by an operator. Thus, the gyroscope is at rest. As the gyroscope drifts, it moves the gimballed platform in order to compensate. Periodic outputs from resolvers in the stabilized platform are recorded. Because it is known that the gyroscope is not moving, any biased rate of movement measured by the gyroscope is attributable to gyroscoping drift rate. When the sensor detects that the vehicle starts to move, or when operator commands are sent to move the gimbal, the calculation of gyroscopic drift rate is completed using the last known time that the vehicle and gimbal were still, and that drift rate is used to compensate for drift when the vehicle is moving.

The gyroscopic drift rate can update again and again as the vehicle stops and starts, automatically without operator intervention. It can be said that the calculation of the drift rate constantly occurs when the vehicle is stopped and only pauses when the vehicle is moved.

The gyroscope can be heated such that its drift rate is higher than its drift rate at a lower temperature. At a certain temperature range, the drift rate may level off such that relatively small temperature changes do not affect the drift rate.

The heading of the gyroscope with respect to Earth can be measured and used for corrections. The Earth rotates around its axis once every 24 hours, or 15° per hour. This rotation can be subtracted out of the measured gyroscopic drift rate based on the heading of the gyroscope and the vehicle's location on the Earth's surface.

Some embodiments of the present application are related to a method of compensating for drift in a vehicle-mounted gyroscope. The method includes receiving, from a first sensor, an indication that a vehicle supporting a gyroscope has stopped moving, receiving rotation-indicating data caused by the gyroscope, the rotation indicating data indicating rotation of a stabilized section of the gimbal over a time period when the vehicle is not moving, computing, using at least one processor operatively coupled with a memory, a gyroscopic drift rate of the gyroscope from the rotation-indicating data, receiving an indication that the vehicle has started moving, and compensating the gimbal stabilized section supported by the vehicle using the gyroscopic drift rate, the compensating occurring while the vehicle is moving The method can further include automatically computing the gyroscopic drift rate using rotation-indicating data from the gyroscope upon receiving the indication that the vehicle has stopped moving, and automatically pausing computing the gyroscopic drift rate upon the indication that the vehicle has started moving.

The gyroscope can be supported by the stabilized section, and the method can further include receiving, from a second sensor, an indication that the stabilized section is not being commanded to move. The rotation-indicating data from the gyroscope is received over a time period when the vehicle is not moving and when the stabilized section is not being commanded to move.

Some embodiments relate to a vehicle-mounted gimbal apparatus compensated for drift of a gyroscope. The apparatus includes at least one input for receiving an indication that a vehicle has started moving or has stopped moving, a gimbal having a stabilized section, a gyroscope supported by the stabilized section, and a circuit, such as a hardware, firmware, or software executing processor. The circuit can be configured for receiving from the at least one input an indication that the vehicle has stopped moving, receiving rotation-indicating data caused by the gyroscope, the rotation-indicating data indicating rotation over a time period when the vehicle is not moving, computing a gyroscopic drift rate of the gyroscope from the rotation-indicating data, receiving from the at least one input an indication that the vehicle has started moving, and compensating the stabilized section using the gyroscope drift rate, the compensating occurring while the vehicle is moving.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention.

DETAILED DESCRIPTION

Aspects of embodiments of the presently claimed invention provide a capability of eliminating inherent drift associated with a gyro stabilized gimbal mounted to a vehicle chassis. An embodiment can utilize the measured values of vehicle motion, gimbal based acceleration, and gimbal resolver angles within the gimbal to compute a corrective factor that minimizes the effects of gyro drift on the stabilization performance of the gimbal system.

An accelerometer triad in the base of the gimbal can be used to detect gimbal platform motion. A vehicle motion sensor (VMS) can be combined with accelerometer data to form a more robust assessment of gimbal base motion. If both the vehicle motion sensor and accelerometer indicate no movement, then it can reasonably be inferred that any rotation detected by the gyroscope and used to stabilize the gimbal by rotating the gimbal's azimuth or elevation motors is due to gyroscope drift.

Rotation-indicating data caused by the gyroscope can be taken directly from the gyroscope as electrical/optical digital data or inferred from movement of the gimbal motors as evidenced by resolver or encoder indications. For example in the latter case, if the gimbal's azimuth resolver indicates a movement of 175 μrad and the elevation resolver indicates a movement of 200 μrad over the course of one hour when the vehicle has been parked and the gimbal has not been commanded to move by a human operator, then the rotation-indicating data from the gyroscope is essentially 175 μrad in azimuth and 200 μrad in elevation. The negatives of each are the drift rates in the associated gyroscope.

In one embodiment, a drift control algorithm is activated whenever the gimbal base is stationary and the gimbal is not being driven by operator commands. When the drift correction algorithm is active, the resolvers, which measure the gimbal pointing angles relative to the gimbal base, are used to correct for gyro drift. Drift corrections are captured and remain in effect when the vehicle starts moving. When the gimbal base becomes stationary, the pointing angles are captured and the drift algorithm will bound deviations from these pointing angles as long as the algorithm is active. The gimbal remains stabilized against sudden base motion while the drift correction algorithm is active—gracefully terminating the algorithm as the motion occurs.

Figure 1:
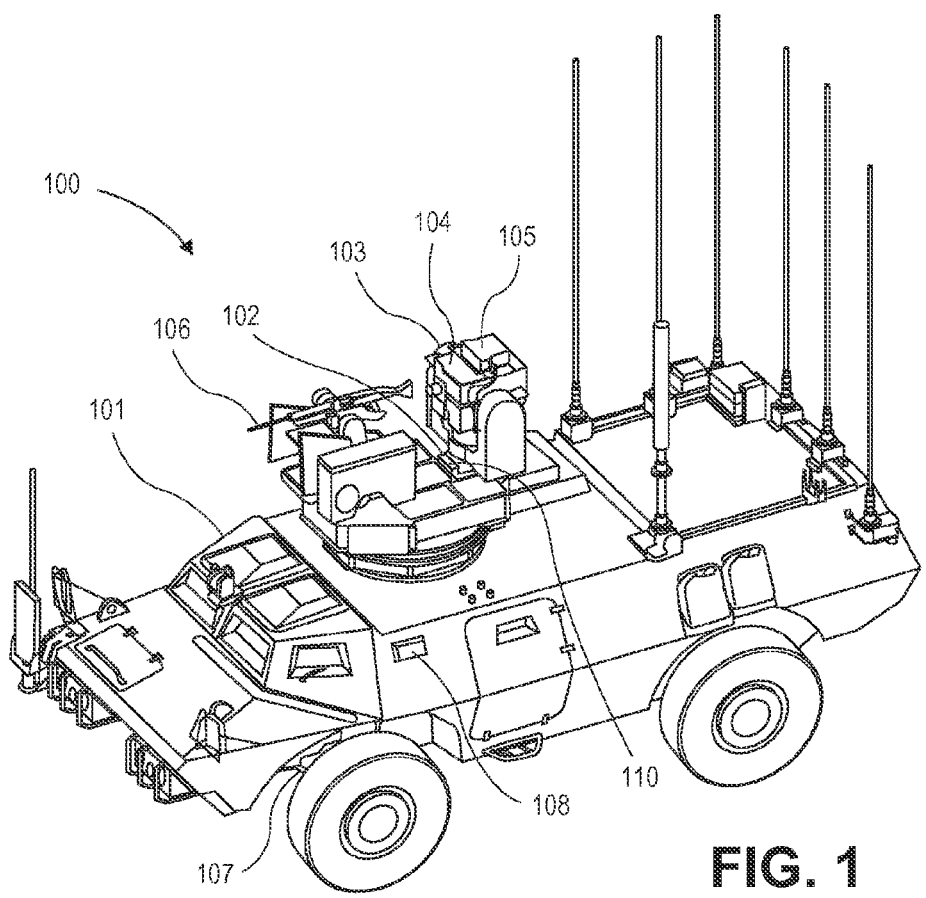
FIG. 1 is a perspective view of an armored land vehicle with a pan-and-tilt gimbaled electro-optical sensor in accordance with an embodiment.

FIG. 1 is a perspective view of an armored land vehicle with a pan-and-tilt gimbaled electro-optical sensor in accordance with an embodiment. System 100 includes armored vehicle 101 upon which are mounted an inertial navigation unit (INU) 102, pan-and-tilt gimbal 103, electro-optical sensor 104, and laser rangefinder 105. Weapon 106 is also mounted on a gimbal.

Vehicle motion sensor 107 is tied to the vehicle's drivetrain and measures whether there is shaft rotation. Outputs from vehicle motion sensor 107 can be routed through central vehicle computer 108, and its outputs combined with others as a data stream that is accessible via a common data bus on the vehicle.

Accelerometers 110 in INU 102 (see FIG. 1) can provide a redundant way of measuring vehicle movement or can be used exclusively to determine vehicle movement if no vehicle movement sensor is available.

Figure 2:
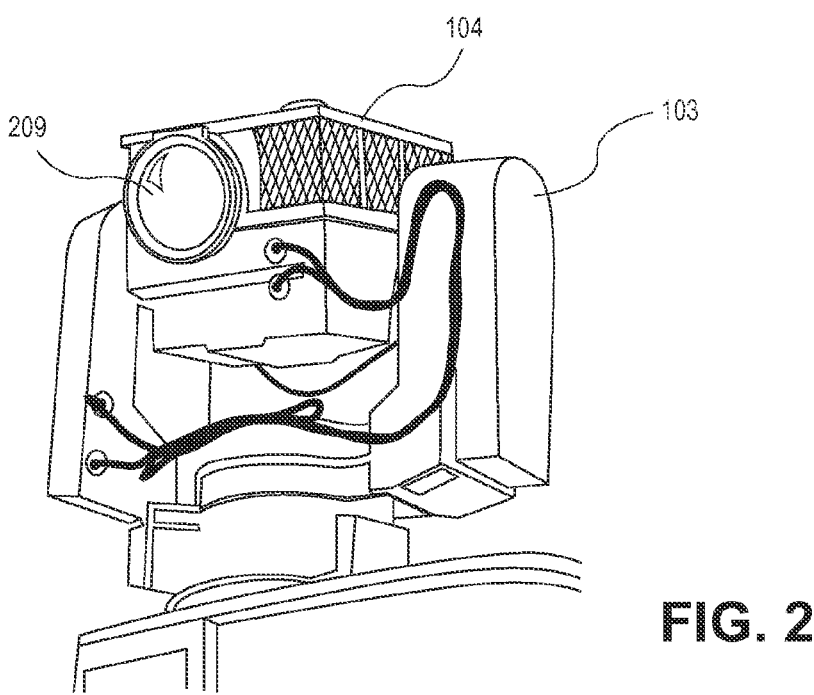
FIG. 2 illustrates a pan-and-tilt gimbal with a sensor in accordance with an embodiment.

FIG. 2 illustrates a pan-and-tilt gimbal with a sensor in accordance with an embodiment. Pan-and-tilt, full-yoke gimbal 103 supports electro-optical sensor 104. Electro-optical sensor incorporates optics for observing, tracking, and zooming into targets behind lens 209.

The housing of electro-optical sensor 104 forms a portion of gimbal 103 that is stabilized in azimuth (i.e., yaw) and elevation (i.e., pitch). A circuit uses the output of a gyroscope attached to the elevation motor to cancel out or otherwise compensate pitch and yaw changes and vibrations of the vehicle underneath. When an operator of electro-optical sensor 104 points lens 209 at a target in the distance, motors in the gimbal's base and ears move the gimbal as needed to keep lens 209 pointed at the target.

Figure 3:
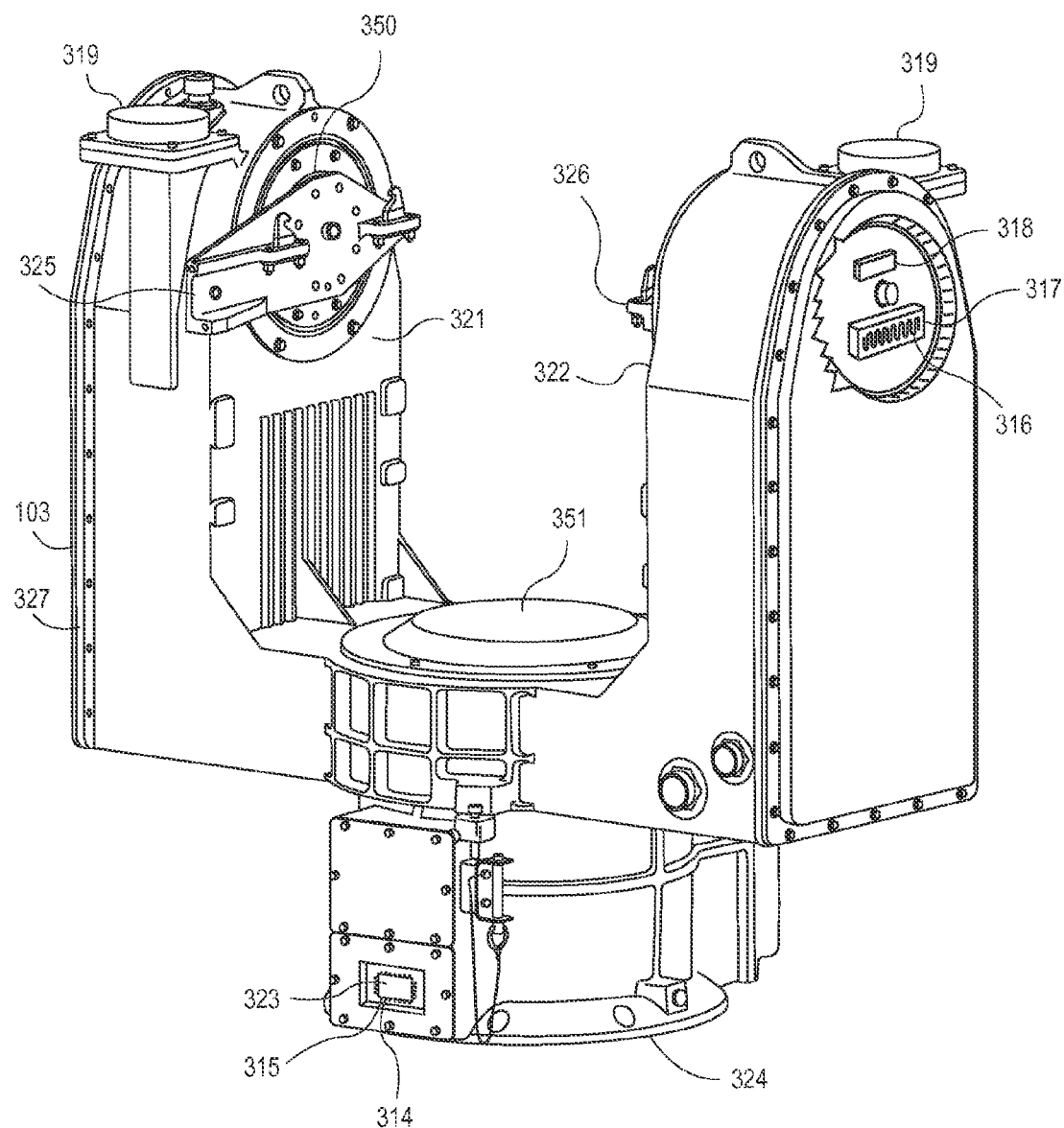
FIG. 3 illustrates a pan-and-tilt gimbal, without an electro-optical sensor installed, in accordance with an embodiment.

FIG. 3 illustrates a pan-and-tilt gimbal, without an electro-optical sensor installed, in accordance with an embodiment. Pan-and-tilt gimbal 103 includes steerable section 327 mounted on non-rotating base 324. Steerable section 327, which is a full-yoke gimbal assembly, includes right hand (RH) arm 321 and left hand (LH) arm 322, which rotate with respect to base 324 in azimuth. The direction in azimuth to which the gimbal points can be read by embedded encoder 351. Similarly, the direction in elevation to which the gimbal points can be read by embedded encoder 350. The encoders are "on-board," meaning that they are part of the fielded version of the gimbal or as otherwise known in the art.

Arms 321 and 322 rotate in a nominal plane of rotation that is parallel with the bottom mounting surface base 324. By mounting an INU and a base to a flat plate, a vertical axis of the INU and a nominal azimuth rotation axis of the gimbal are parallel and aligned.

Steerable section 327 also includes right hand ear 325 and left hand ear 326, which rotate up and down with respect to yoke arms 321 and 322, to which they are directly mounted, respectively. Right and left hand ears 325 and 326 rotate up and down in unison.

Gyroscope 317 is supported by the stabilized elevation portion of gimbal 103, inside yoke arm 322. Gyroscope 317 has outputs that indicate three angles of rotation: an angle of rotation in pitch, yaw, and roll. These outputs are connected with a stabilization computer that automatically, without direct human intervention, moves motors next to resolvers 551 and 552 in order to cancel out uncommanded rotation with respect to the inertial frame.

Heater 316 is thermally bonded to the housing of gyroscope 317. The heater is configured to heat gyroscope 317 well above typical consumer-grade maximum operating temperature 60° C. (140° C.) to just below the boiling point of water. The inventors recognized that gyroscopic drift rate is dependent on temperature, and it typically increases (i.e., gets worse) with temperature. However, at a point above 60° C., the increase in the gyroscopic drift rate levels off so that it is relatively independent of temperature within a range.

Technical advantages of heating the gyroscope to such a temperature include inducing a gyroscopic drift rate that is more predictable and thus easier to cancel out. Heating typically takes less energy than cooling, and such a high temperature means only heating elements are necessary as ambient, outside temperature will always be less. Thus, cooling only requires turning down or off the heating element.

Circuit 323, with inputs 314 and 315 for receiving an indication that the vehicle has started or stopped moving, is enclosed in gimbal base 324. Circuit 323 is equipped with at least one processor and a memory for computing a gyroscopic drift rate of gyroscope 317 and subtracting or otherwise compensating for the gyroscopic drift rate over time. Circuit 323 collects data with respect to time in order to compute the gyroscopic drift rate.

Global positioning system (GPS) sensors 319 are part of interferometer 317, which measures gimbal heading with respect to the Earth. By knowing the heading and location on Earth, the components of 'drift' due to the Earth's rotation of 15° per hour can be canceled or otherwise subtracted from the correction algorithms.

As a simplified example, if the vehicle is parked at the equator and the electro-optical sensor pointed due east (at a 0.090° heading), the result of the stabilized platform attempting to keep the electro-optical lens pointed in the same direction in space would be a perceived 'drift' of the sensor upwards in the elevation direction by 15° per hour. However, if the sensor at the equator is pointed due north (at a 360° heading), then there would be no 'drift' of the sensor due to the Earth's rotation because the Earth's axis would be aligned with the uncompensated roll axis of the gimbal. One of ordinary skill in the art will recognize that the vehicle's latitude and the heading of the gimbal's pointable section determine the magnitude of the Earth's rotation's effect on the stabilized section.

Figure 4:
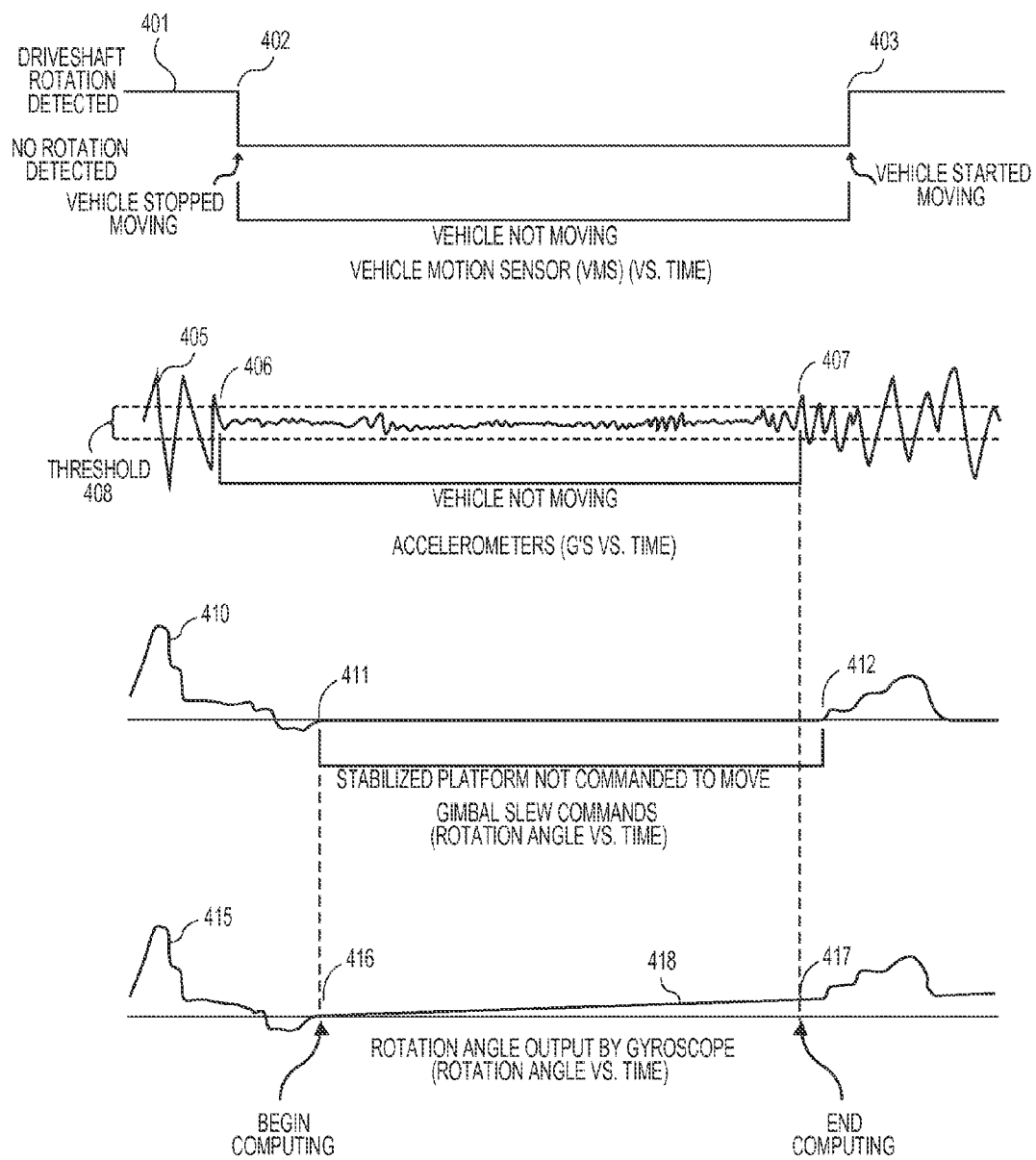
FIG. 4 illustrates timing diagrams for a gyroscopic drift rate computation in accordance with an embodiment.

FIG. 4 illustrates timing diagrams for a gyroscopic drift rate computation in accordance with an embodiment. In the figure, time increases to the right.

Signal 401 of vehicle motion sensor 107 (see FIG. 1) is high when driveshaft rotation is detected and low when no rotation is detected. At time point 402, vehicle movement has stopped. At time point 403, vehicle movement has again started. During the time between time points 402 and 403, the vehicle is motionless. Updates from vehicle motion sensor 107 can be received periodically, for example, every 10 milliseconds.

Signal 405 of accelerometers 110 (see FIG. 3) is a vector of acceleration from a triple pack of orthogonal accelerometers. The signal can be computed by directionally combining the vectors, i.e., sqrt($a_x^2+a_y^2+a_z^2$). When signal 405 falls below threshold 408, it is determined that there is no movement of the accelerometers. Any non-zero motion data below the predetermined threshold is regarded as accelerometer noise unrelated to actual movement. At time point 406, in which accelerometer signal 405 falls below threshold 408, the vehicle is regarded as stopped. At time point 407, in which accelerometer signal 405 rises above threshold 408, the vehicle is regarded as moving.

As shown, a determination based on vehicle motion sensor 107 (see FIG. 1) that the vehicle has stopped or started may not fall exactly at the same times for the same determination from accelerometers 110 (see FIG. 3). This may be due to movement of the vehicle without rotation of its drivetrain, such as rocking from wind, personnel climbing around, etc., and vice versa, constant rotation of the drivetrain without acceleration may trick the accelerometers into sensing no movement. For calculating a gyroscopic drift rate, one would take the time period in which both sensors indicated that the vehicle was motionless.

Signal 410 of operator slew commands is a composite of azimuth and elevation rotation commands from a human operator. If the vehicle is stopped but the operator is still moving the gimbal, as is shown just before time point 411 in the figure, then all movement of the gyroscope is not attributable to gyroscopic drift before this point. As shown at time point 412, just as the vehicle is beginning to move again, the operator commands the gimbal to move.

The latest time period in which the vehicle is not moving and the gimbal is not being commanded to move is time point 411. At this time point, corresponding to algorithm start time 416, resolvers 351 and 352 (see FIG. 3) are periodically read to determine any angular motion. As gyroscope 317 moves motors to stabilize the electro-optical sensor 104 so that it does not 'move,' resolvers (or encoders) 351 and 352 effectively indicate how much drift is in the gyroscope.

The earliest time period that the vehicle moves or the gimbal is commanded to move is time point 407. At this time point, corresponding to algorithm stop time 417, resolvers 351 and 352 (see FIG. 3) are no longer read in order to determine angular motion. Instead, the last angles that the resolvers indicated before movement is compared with the angles at time period 416 to determine a difference in angles. That is, a difference between a first angle position and a second angle position over the period of time between 416 and 417 is determined. Then, the rate of movement is calculated by dividing the difference by the time in order to compute a drift rate of the gyroscope. In mathematical form, the computation can be expressed as:

$$AZ\_drift\_rate = (AZ\_angle_{417} - AZ\_angle_{416})/(time_{417} - time_{416}) \quad \text{Eqn. 1:}$$

$$EL\_drift\_rate = (EL\_angle_{417} - EL\_angle_{416})/(time_{417} - time_{416}) \quad \text{Eqn. 2:}$$

where the AZ denotes azimuth, EL denotes elevation, and the subscripts 416 and 417 indicate respective attributes at times 416 and 417.

Slope 418 represents the inverse of the gyroscopic drift rate. After time 417, when the vehicle is moving or the gimbal is being commanded to move, drift rates for azimuth and elevation are applied to compensate the gimbal stabilized section, electro-optical sensor 104. For example, the drift rate multiplied by the applicable time is subtracted from the stabilization algorithm. This correction is applied when the vehicle moves, the gimbal is commanded to move, or when it stops again.

Figure 5:
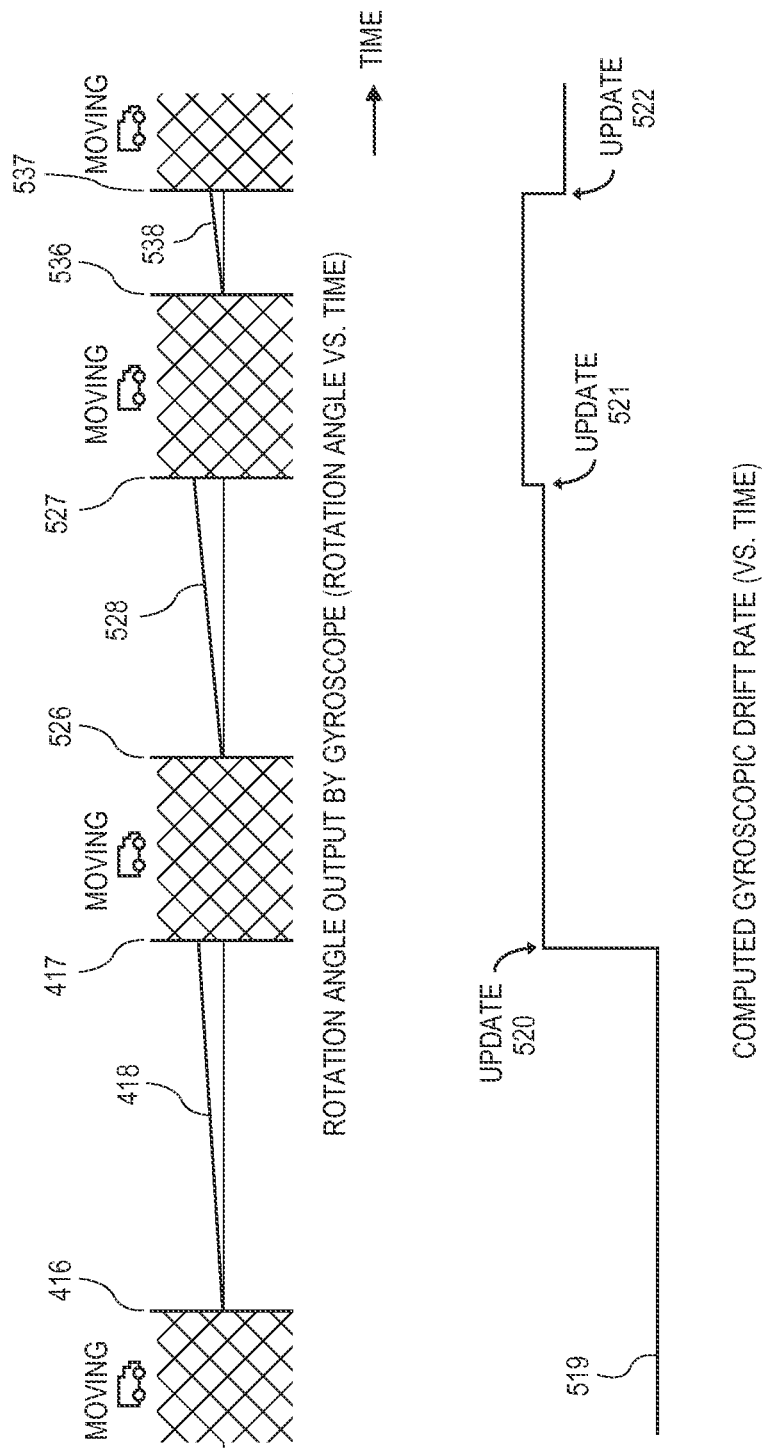
FIG. 5 is a timing diagram of multiple updates to the gyroscopic drift rate of FIG. 4 in accordance with an embodiment.

FIG. 5 is a timing diagram of multiple updates to the gyroscopic drift rate of FIG. 4 in accordance with an embodiment. Each time that the vehicle is stopped and the gimbal has not been commanded to move by an operator, the drift correction algorithm starts again. At time point 416 to 417, slope 418 is calculated. Then, at time point 417, corresponding to update time 520, drift rate 519 is updated for the correction algorithm.

At time point 526, an indication comes that the vehicle has stopped moving again, and the gyroscopic drift rate is automatically re-computed using new encoder/resolver information. At time point 527, an indication comes that the vehicle is moving again, and so the gyroscopic drift rate—now computed as slope 528—is updated at time 527, corresponding to update time 521.

At time point 536, an indication comes that the vehicle has stopped moving yet again, and the gyroscopic drift rate is automatically re-computed using new encoder/resolver information. At time point 537, an indication comese that the vehicle is moving or that the gimbal is being commanded to move again, and so the gyroscopic drift rate—now computed as slope 538—is updated at time 537, corresponding to update time 522.

Gyroscopic drift rate 519 is updated at update times 520, 521, 522, and on. The updating can be perpetual, and an updated gyroscopic drift rate can be stored in nonvolitile memory for when the gimbal and stabilization electronics are powered down. For testing, maintenance, or factory calibration, a user or the factory may reside gyroscopic drift rate to zero or another predetermined value.

If a drift rate changes too much, or is implemented all at once when the vehicle begins moving again, it can cause unsettling jumps in pointing direction. Thus, portions of the updated gyroscopic drift rate can be blended in over time. For example, if the gyroscopic drift rate has changed more than a predetermined threshold 'x,' then an x portion of the drift rate can be phased in over one minute, followed by another x portion another minute, and so on until the entire updated gyroscopic drift rate is implemented.

Figure 6:
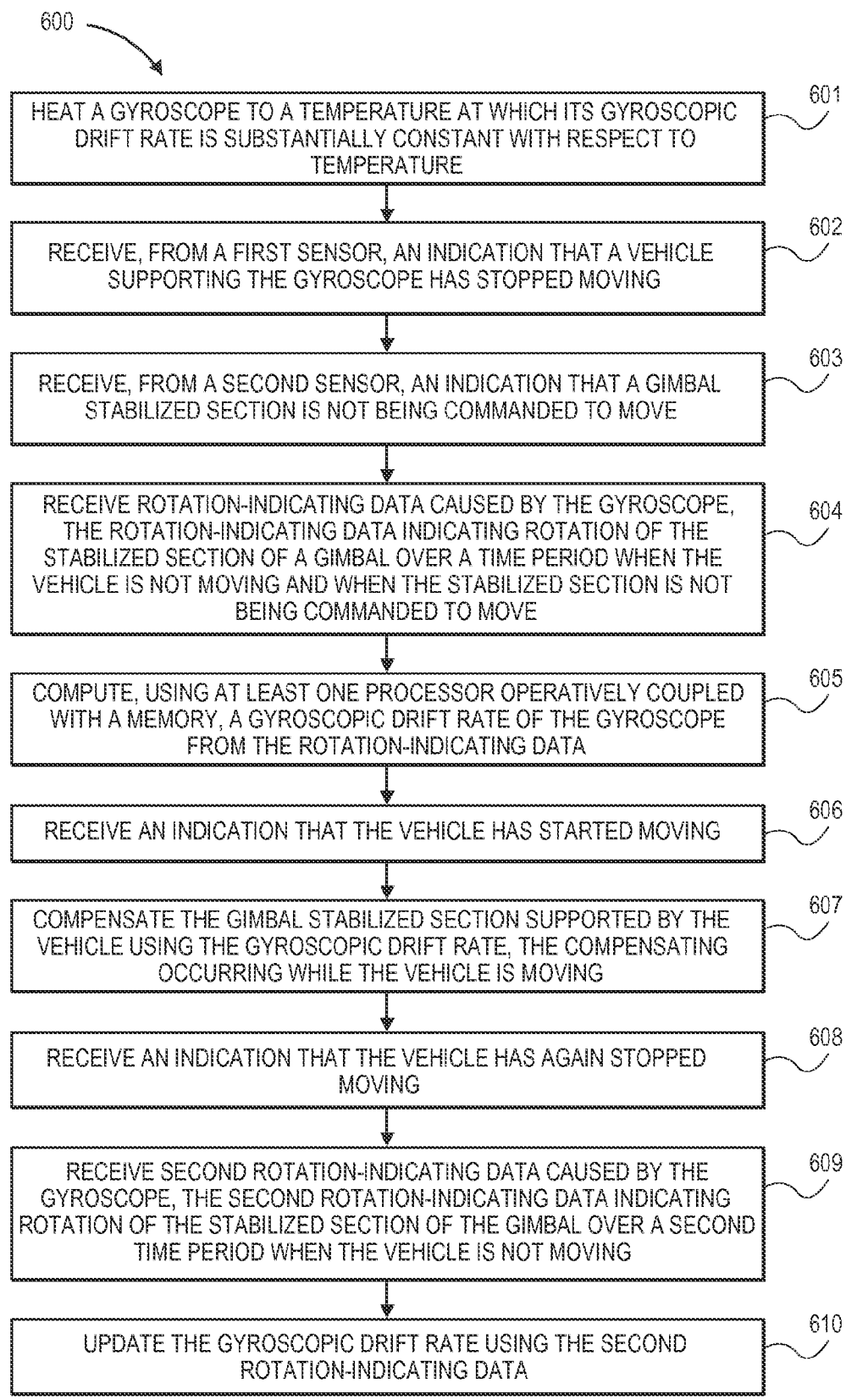
FIG. 6 is a flowchart illustrating a process in accordance with an embodiment.

FIG. 6 is a flowchart illustrating a process in accordance with an embodiment. Process 600 can be performed at a factory or by others as appropriate. The process can be implemented in a computer or stored on a machine-readable non-transitory tangible storage medium, such as a solid state disk drive, and executed on a computer processor. In operation 601, a gyroscope is heated to a temperature at which its gyroscopic drift rate is substantially constant with respect to temperature. In operation 602, an indication that a vehicle supporting the gyroscope has stopped moving is received from a first sensor. In operation 603, an indication that a gimbal stabilized section is not being commanded to move is received from a second sensor. In operation 604, rotation-indicating data is received from the gyroscope over a time period when the vehicle is not moving and when the stabilized section is not being commanded to move. In operation 605, a gyroscopic drift rate of the gyroscope is computed from the rotation-indicating data using at least one processor operatively coupled with a memory. In operation 606, an indication that the vehicle has started moving is received. In operation 607, the gimbal stabilized section supported by the vehicle is compensated using the gyroscopic drift rate, the compensating occurring while the vehicle is moving. In operation 608, an indication that the vehicle has again stopped moving is received. In operation 609, second rotation-indicating data caused by the gyroscope is received, the second rotation-indicating data indicating rotation of the stabilized section of the gimbal over a second time period when the vehicle is not moving. In operation 610, the gyroscopic drift rate is updated using the second rotation-indicating data.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

One or more features from any embodiment may be combined with one or more features of any other embodiment without departing from the scope of the technology.

A recitation of "a", "an" or "the" is intended to mean "one or more" unless specifically indicated to the contrary.

What is claimed is:

1. A method of compensating for drift in a vehicle-mounted gyroscope, the method comprising:
   receiving, from a first sensor, an indication that a vehicle supporting a gyroscope has stopped moving;
   receiving, from a second sensor, an indication that the stabilized section is not being commanded to move;
   receiving rotation-indicating data caused by the gyroscope, the rotation-indicating data indicating rotation of a stabilized section of a gimbal over a time period when the vehicle is not moving and the stabilized section is not being commanded to move;
   computing, using at least one processor operatively coupled with a memory, a gyroscopic drift rate of the gyroscope from the rotation-indicating data;
   receiving an indication that the vehicle has started moving or the stabilized section is being commanded to move; and
   compensating the gimbal stabilized section supported by the vehicle using the gyroscopic drift rate.

2. The method of claim 1 further comprising:
   automatically computing the gyroscopic drift rate using rotation-indicating data from the gyroscope upon receiving the indication that the vehicle has stopped moving or the stabilized section is being commanded to move; and
   automatically pausing computing the gyroscopic drift rate upon the indication that the vehicle has started moving or the stabilized section is being commanded to move.

3. The method of claim 1 further comprising:
   receiving an indication that the vehicle has again stopped moving;
   receiving second rotation-indicating data caused by the gyroscope, the second rotation-indicating data indicating rotation of the stabilized section of the gimbal over a second time period when the vehicle not moving and the stabilized section is not being commanded to move; and
   updating the gyroscopic drift rate using the second rotation-indicating data.

4. The method of claim 1 further comprising:
   heating the gyroscope to a temperature at which the gyroscopic drift rate is substantially constant with respect to temperature.

5. The method of claim 1 further comprising:
   ascertaining a heading of the gyroscope with respect to the Earth when receiving rotation-indicating data from the gyroscope over a time period when the vehicle is not moving;
   adding or subtracting a component attributable to Earth rotation from the gyroscopic drift rate based on the heading.

6. The method of claim 1 wherein the compensating includes incrementally compensating for portions of the gyroscopic drift rate over time as the vehicle is moving.

7. The method of claim 1 wherein the rotation-indicating data is periodically received from the gyroscope.

8. The method of claim 1 wherein the first sensor includes an inertial navigation unit (INU) integrated with the vehicle.

9. The method of claim 1 wherein the first sensor includes one or more accelerometers supported by the vehicle.

10. The method of claim 1 wherein receiving an indication that the vehicle has stopped moving includes receiving non-zero motion data indicating motion below a predetermined threshold.

11. The method of claim 1 further comprising:
    dividing a difference between a first angle position and a second angle position by a time period in order to compute the drift rate of the gyroscope.

12. The method of claim 1 wherein receiving an indication that the vehicle has started moving is from the first sensor.

13. The method of claim 1 wherein the first sensor measures shaft rotation of a drivetrain of the vehicle, the method further comprising:
    receiving, from at least one accelerometer device, an indication that the vehicle is not moving.

14. A machine-readable non-transitory storage medium embodying information indicative of instructions for causing one or more machines to perform operations comprising:
    receiving, from a first sensor, an indication that a vehicle supporting a gyroscope has stopped moving;
    receiving, from a second sensor, an indication that the stabilized section is not being commanded to move;
    receiving rotation-indicating data caused by the gyroscope, the rotation-indicating data indicating rotation of a stabilized section of a gimbal over a time period when the vehicle is not moving and the stabilized section is not being commanded to move;
    computing, using at least one processor operatively coupled with a memory, a gyroscopic drift rate of the gyroscope from the rotation-indicating data;
    receiving an indication that the vehicle has started moving or the stabilized section is being commanded to move; and
    compensating the gimbal stabilized section supported by the vehicle using the gyroscopic drift rate.

15. A vehicle-mounted gimbal apparatus compensated for drift of a gyroscope, the apparatus comprising:
    at least one first input for receiving an indication that a vehicle has started moving or has stopped moving;
    a gimbal having a stabilized section;
    at least one second input for receiving an indication that the stabilized section is not being commanded to move;
    a gyroscope supported by the stabilized section; and
    a circuit configured for:
      receiving from the at least one first input an indication that the vehicle has stopped moving;
      receiving from the at least one second input an indication that the stabilized section is not being commanded to move;
      receiving rotation-indicating data caused by the gyroscope, the rotation-indicating data indicating rotation over a time period when the vehicle is not moving and the stabilized section is not being commanded to move;
      computing a gyroscopic drift rate of the gyroscope from the rotation-indicating data;
      receiving from the at least one input an indication that the vehicle has started moving or the stabilized section is being commanded to move; and
      compensating the stabilized section using the gyroscope drift rate, the compensating occurring while the vehicle is moving.

16. The apparatus of claim 15 further comprising:
    at least one or more accelerometers supported by the vehicle and operatively connected with the at least one input.

17. The apparatus of claim 15 further comprising:
    the vehicle, the vehicle selected from the group consisting of a wheeled armored vehicle, tracked vehicle, surface ship, helicopter, lighter-than-air aircraft, and airplane.

18. The apparatus of claim 15 further comprising:
a heater configured to heat the gyroscope to a temperature at which the gyroscopic drift rate is substantially constant with respect to temperature.

19. The apparatus of claim 15 further comprising:
a heading indication device configured to ascertain a heading of the gyroscope with respect to the Earth when the vehicle is not moving,
the circuit further configured for adding or subtracting a component attributable to Earth rotation from the gyroscopic drift rate based on the heading.

20. The apparatus of claim 19 wherein the heading indication device includes a global positioning system (GPS) interferometer.

* * * * *